United States Patent [19]

Wallace

[11] 3,722,822

[45] Mar. 27, 1973

[54] TAPE TAKE-UP DRIVE ASSEMBLY

[76] Inventor: Samuel P. Wallace, 929 Georgia, S.E., Albuquerque, N. Mex. 87108

[22] Filed: Dec. 8, 1969

[21] Appl. No.: 882,849

[52] U.S. Cl. ..................242/67.4, 242/57, 242/75.3, 242/75.5, 242/189

[51] Int. Cl. ....B65h 25/32, B65h 25/22, B65h 25/04

[58] Field of Search...........242/46.2, 46.21, 57, 75.3, 242/75.5, 189, 67.3, 190, 67.4, 67.5, 75.51; 200/169, 61.18, 61.41

[56] References Cited

UNITED STATES PATENTS

| | | | |
|---|---|---|---|
| 2,005,738 | 6/1935 | Foster et al | 242/189 |
| 2,598,950 | 6/1952 | Walker | 242/57 |
| 2,670,904 | 3/1954 | Ryan | 242/190 |
| 2,977,059 | 3/1961 | Mero | 242/75.5 X |
| 3,131,339 | 4/1964 | Burr | 242/190 X |
| 3,405,857 | 10/1968 | Albrecht | 242/75.3 X |

*Primary Examiner*—George F. Mautz
*Attorney*—Clarence A. O'Brien and Harvey B. Jacobson

[57] ABSTRACT

A tape handling device for a tape processing machine having a punch tape unit from which the tape is expelled. An upper take-up reel driven by a motor drive is rendered operative under the control of a tape tension switch. Magnetic means releasably hold reels on the upper and lower reel shafts. The motor drive is reversible and variable in speed for tape take-up and rewind purposes.

7 Claims, 9 Drawing Figures

Patented March 27, 1973 3,722,822

2 Sheets-Sheet 1

Samuel P. Wallace
INVENTOR

BY Clarence A. O'Brien
and Harvey B. Jacobson
Attorneys

Patented March 27, 1973 3,722,822

2 Sheets-Sheet 2

Samuel P. Wallace
INVENTOR

BY Clarence A. O'Brien
and Harvey B. Jacobson
Attorneys

TAPE TAKE-UP DRIVE ASSEMBLY

This invention relates to the handling of punch tape and more particularly tape processed by machines having tape punch and tape reading units.

An important object of the present invention is to provide a relatively simple and reliable device for teletype machines or other equipment having different tape handling capabilities including the take-up of tape as punched, rewind of tape for proper tape reader input and automatic reader operation.

In accordance with the present invention, the tape handling device includes a pair of vertically spaced reel shafts extending from a base on which tape take-up reels may be releasably held by magnetic means. A drive motor having a drive element is mounted on the base adjacent to the upper reel shaft for peripheral drive engagement with a take-up reel on the upper reel shaft. Tape expelled from the tape punch unit may accordingly be guided about a tension switch mechanism onto the take-up reel which is driven by the motor under control of the tension switch mechanism. The motor is energized whenever there is sufficient slack in the tape. The speed of the motor may be varied under control of a rheostat while a motor reversing switch is provided for rewind purposes by transferring tape stored on one reel to another reel utilizing both reel shafts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
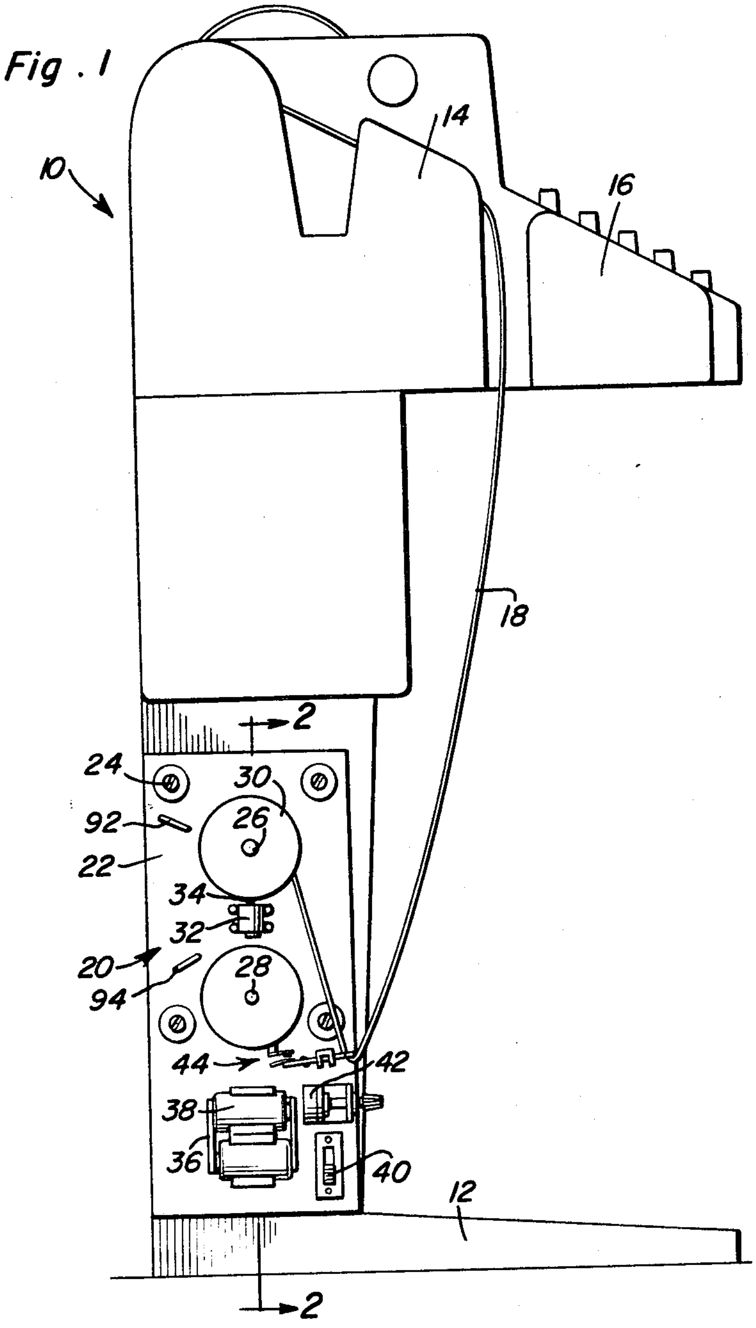
FIG. 1 is a side elevational view of a typical teletype machine on which the tape handling device of the present invention is mounted and shown in one mode of operation.

Referring now to the drawings in detail, and initially to FIG. 1, a typical teletype machine is shown generally denoted by reference numeral 10. The teletype machine includes a pedestal base 12, supporting the machine console having a punch tape unit 14 and a tape reader unit 16 on one side thereof. As shown in FIG. 1, punched tape 18 is expelled from the tape punch unit by means of the tape handling attachment generally referred to by reference numeral 20.

The tape handling device is mounted on the side of the machine pedestal and toward this end includes a base plate 22 fastened to the machine pedestal by a plurality of fastener assemblies 24. Alternatively, the base may be releasably mounted by magnetic holding means for example, so as to render the device portable. Fixedly mounted on the base plate and projecting horizontally therefrom is an upper reel shaft 26 and a lower reel shaft 28. The reel shafts are vertically spaced from each other a sufficient distance to accommodate conventional take-up reels 30 and an electric drive motor 32 fixedly mounted on the base plate with its output shaft 34 radially positioned relative to the axis of the upper reel shaft 26.

Also mounted on the base plate 22 below the lower reel shaft 28, is a bracket 36 for holding a pair of batteries 38. A slide type motor reversing switch 40 is mounted on the base plate adjacent to a speed controlling rheostat switch 42. A tension switch mechanism 44 also mounted on the base plate engages and guides the tape 18 as it is wound upon the take-up reel 30 in order to control energization of the drive motor 32.

Figure 2:
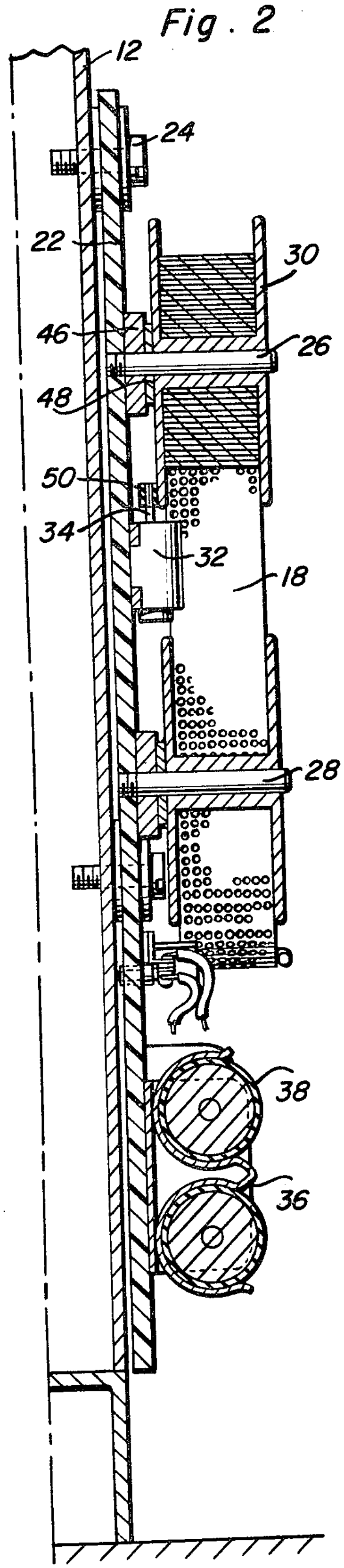
FIG. 2 is an enlarged side sectional view taken substantially through a plane indicated by section line 2—2 in FIG. 1.

As more clearly seen in FIG. 2, a magnetic pad 46 is mounted about each of the reel shafts so as to releasably hold a take-up reel 30 thereon having a magnetic element 48 secured thereto for engagement with the magnetic pad 46. When so positioned on the upper reel shaft 26, the periphery of the reel 30 will be in frictional engagement with a rubber-like tubular section 50 mounted on the motor output shaft 34 constituting a frictional drive for the reel on the upper reel shaft. Thus, whenever the drive motor is energized, the reel 30 on the upper reel shaft is rotated in order to wind the tape 18 thereon thereby tensioning the tape as it is expelled from the punch unit 14. When the tape tension becomes excessive, the tension switch mechanism 44 opens to deenergize the drive motor. As the tape continues to be fed out of the punch unit, the tension slackens permitting the tension switch mechanism to close once again so that energization of the drive motor may resume.

Figure 9:
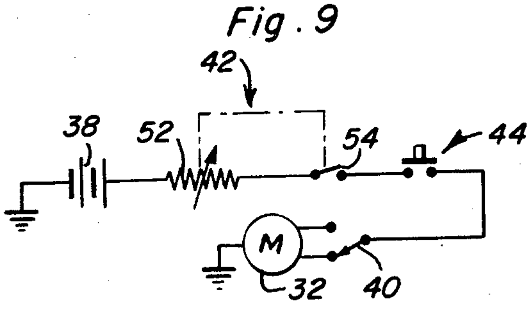
FIG. 9 is an electrical circuit diagram representing the controls associated with the apparatus.

The electrical control circuit for the drive motor 32 is diagrammatically illustrated in FIG. 9 showing the output terminal of the batteries 38 connected in series with the motor through the speed adjusting rheostat device 42 which includes an adjustable resistor section 52 and an on-off switch section 54 opened at the low speed end of the adjustable resistor section 52. Upon closing of the on-off switch 54 when the rheostat switch device 42 is set in a desired speed position, energizing current for the motor is conducted through the tension switch mechanism 44 and the reversing switch 40 to the motor for drive of the reel on the upper reel shaft. Drive of the motor in one direction will accordingly take up the tape from the tape punch unit 14 as hereinbefore indicated.

After the punched tape is stored on the take-up reel, it may be conditioned for tape reading purposes by transferring it to another reel. After a full reel is placed on the lower reel shaft 28 and an empty reel on the upper reel shaft, the tape is transferred to the empty reel by energization of the motor in a reverse or rewind direction. The motor direction is of course controlled by the reversing switch 40 for this purpose.

Figure 3:
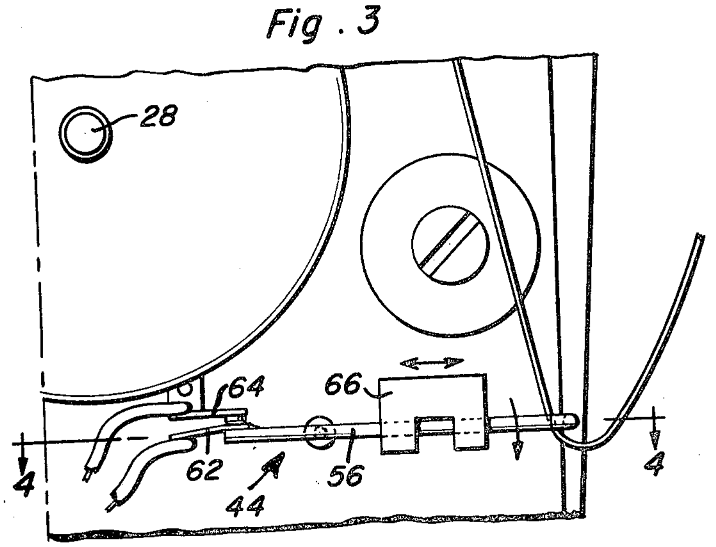
FIG. 3 is an enlarged partial front elevational view of the tape handling attachment shown in FIG. 1.
Figure 4:
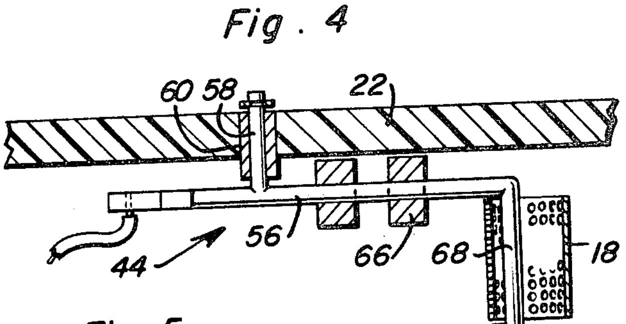
FIG. 4 is a partial sectional view taken substantially through a plane indicated by section line 4—4 in FIG. 3.

The tension switch mechanism 44 is normally closed whenever it is in disuse and whenever the tension in the tape engaged therewith is below an adjusted maximum value. As more clearly seen in FIGS. 3 and 4, the tension switch mechanism includes a lever element 56 rotatably mounted by a fulcrum pin 58 on the base plate 22 provided with a sleeve bearing 60 for this purpose. A movable contact element 62 is secured to one end of the lever element 56 for engagement with a stationary contact element 64 mounted on the base plate. An adjustably positioned weight 66 is mounted on the lever element 56 on the side of the fulcrum pin 58 opposite the movable contact element 62 in order to establish an adjustable gravitational bias holding the movable contact element 62 in engagement with the fixed contact element 64 to thereby complete a motor energizing circuit. A guide arm 68 extends from the lever element at an end on the same side of the fulcrum pin as the weight 66. The tape 18 is entrained about the guide arm 68 so as to exert an upward force on the lever element 56 dependent upon the tension in the tape. By adjusting the position of the weight 66, the tension force exerted on the lever element necessary to open the switch contacts will be preset.

Figure 5:
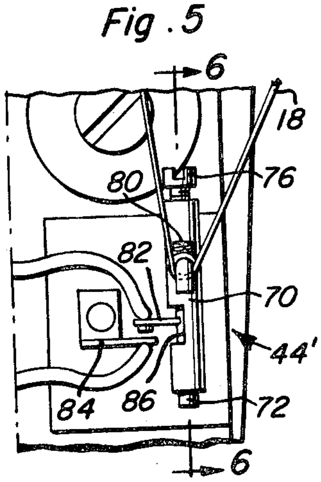
FIG. 5 is a partial front elevational view of a modified form of tape handling attachment.
Figure 6:
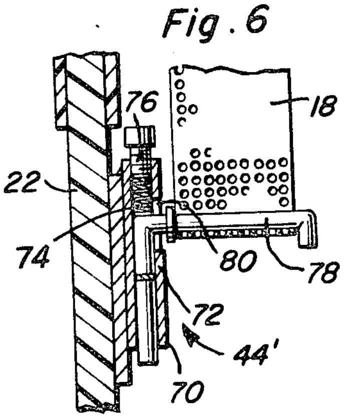
FIG. 6 is a sectional view taken substantially through a plane indicated by section line 6—6 in FIG. 5.

Another form of tension switch mechanism 44' is illustrated in FIGS. 5 and 6. In this type of tension switch mechanism, a tubular slide bracket 70 is fixedly mounted on the base plate 22 in a vertical position. A slide element 72 is received within the slide tube 70 and is urged downwardly by the bias of a spring element 74 disposed between the upper end of the slide element 72 and a bias adjusting screw 76 threadedly received within the upper end of the guide tube 70. A tape guide arm 78 is connected to the upper end of the guide element 72 and projects therefrom through an opening 80 in the guide tube. The tape 18 is entrained about the guide arm 78 so as to exert an upward force opposed by the adjustable spring bias. Thus, when the tension in the tape becomes excessive, it will upwardly displace the slide element 72 against the bias of spring element 74 in order to withdraw a movable contact element 82 from engagement with a fixed contact element 84 mounted on the base plate 22. The movable contact element 80 is connected to the slide element 72 and projects therefrom through a slot 86 formed in the guide tube 70 as shown in FIG. 5.

Figure 7:
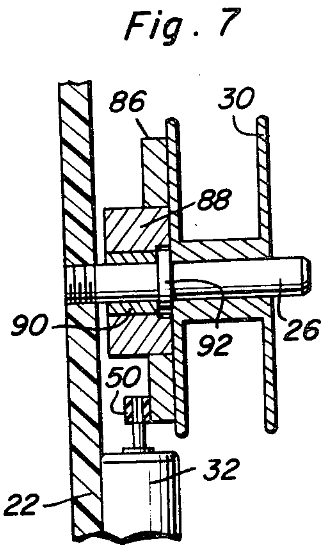
FIG. 7 is a partial side sectional view showing another form of reel drive.

FIG. 7 illustrates another form of drive for the reels such as the upper reel 30 on shaft 26. A driven disc 86 is peripherally engaged by the friction drive gear 50 and is provided with a magnetic insert 88 journaled on the shaft 26 by a sleeve 90. A pin 92 axially holds the sleeve axially assembled on the shaft so that the magnetic insert may releasably hold the reel thereon and, through disc 86 transmit drive to the reel.

Figure 8:
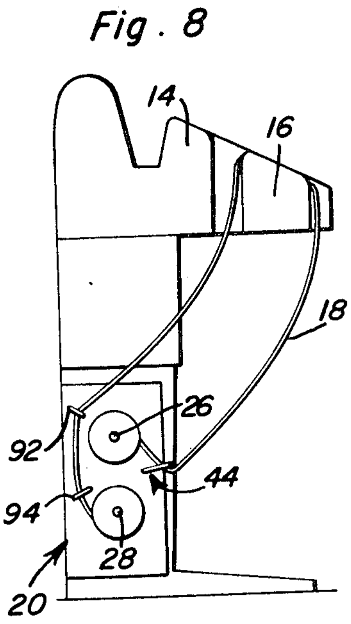
FIG. 8 is a simplified view of the tape handling device in another mode of operation.

FIG. 8 shows use of the device 10 in an automatic reader unit mode of operation. The reel on the upper shaft 26 acts as the take-up reel onto which the tape is wound after being withdrawn from the reader unit 16. The tape is guided from the feed reel on the lower shaft 28 through guide elements 94 and 96 on the base 22 to the reading unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a punched tape utilization device, a tape handling apparatus comprising a readily removable panel fastened to said device, a source of electrical voltage, a pair of vertically spaced reel shafts rigidly mounted on the removable panel and extending therefrom, a reel carrying means mounted on one of the shafts, a motor fixedly mounted to the panel adjacent the one shaft having an output shaft radially aligned therewith, drive means operatively engaging the output shaft for imparting rotation to the reel carrying means, and tape tension responsive switch means mounted on the removable panel electrically connecting the source of voltage to the motor for energization thereof.

2. The combination of claim 1 wherein said drive means comprises a friction gear element mounted on the output shaft of the motor.

3. The combination of claim 1 wherein said tension responsive switch means comprises a tubular slide bracket fastened to said removable panel, a spring-biased slide slidably received in said tubular bracket, a guide arm extending perpendicular from the slide for engagement with the tape, a removable contact connected to the slide, a fixed contact engageable by the movable contact upon displacement of the slide, a bias spring mounted in said tubular bracket and biasingly engaging said slide.

4. The combination of claim 1 wherein said tension responsive switch means comprises a gravitationally biased lever pivotally mounted on the removable panel, a guide arm carried by the lever in engagement with the tape, a movable contact connected to the lever and a fixed contact engageable by the movable contact upon displacement of the lever against said gravitational bias.

5. The combination of claim 1 wherein said source of voltage is mounted on said removable panel providing a portable tape handling apparatus.

6. The combination of claim 5 wherein said tape handling apparatus includes motor reversing and speed controls mounted on said removable panel.

7. The combination of claim 3 wherein said tension responsive switch means includes an adjustment screw threadedly received in said tubular bracket and engaging said biasing spring for adjustment thereof.

* * * * *